March 22, 1938.                S. H. GIBSON                2,112,208
                             TAP BUSHING VALVE
                          Filed Oct. 31, 1935          2 Sheets-Sheet 2
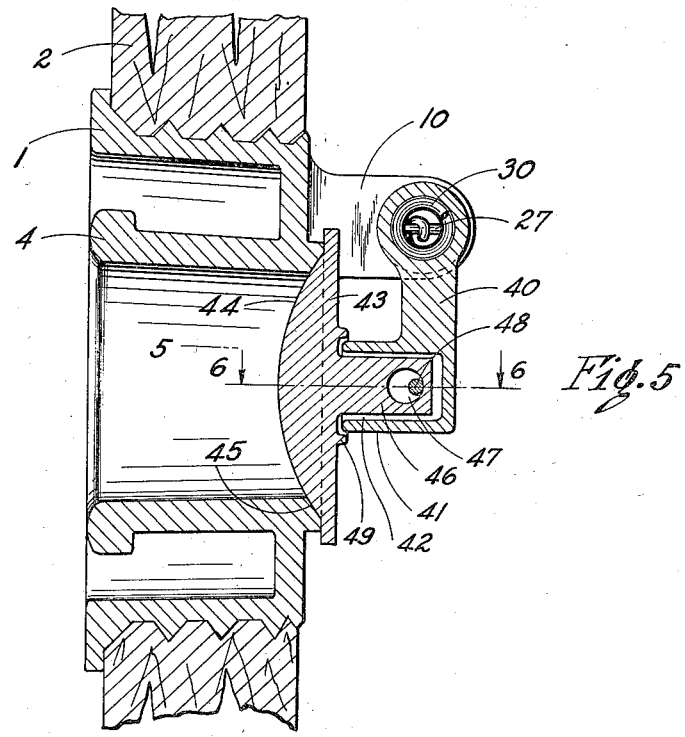
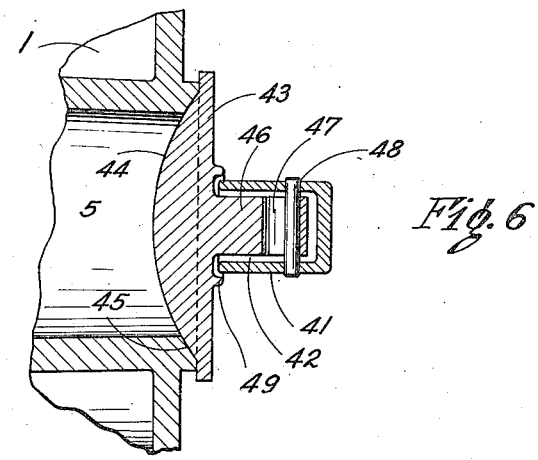
Inventor
SAMUEL H. GIBSON
Attorneys Patented Mar. 22, 1938

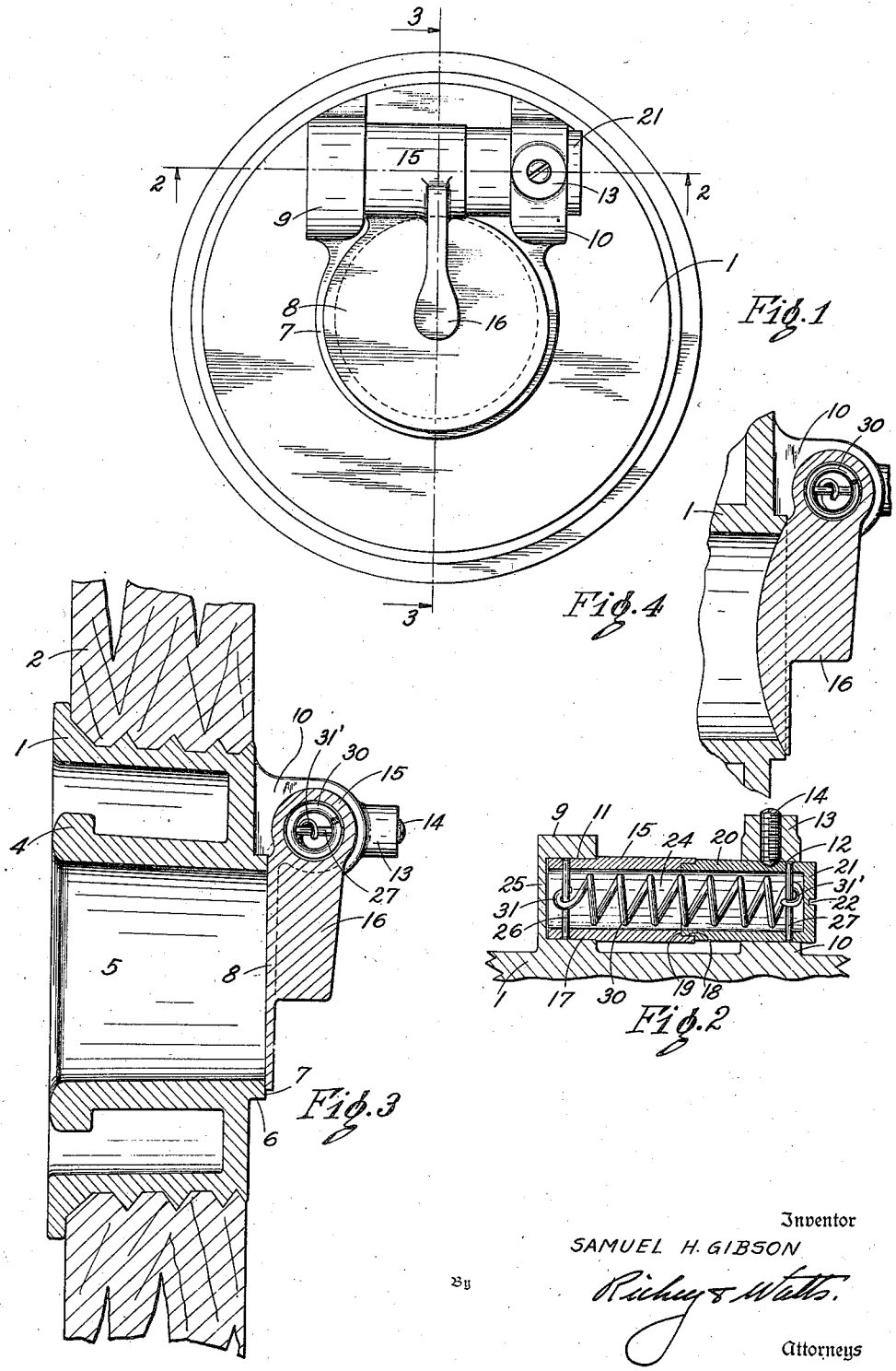

2,112,208

UNITED STATES PATENT OFFICE 2,112,208

TAP BUSHING VALVE

Samuel H. Gibson, Lakewood, Ohio, assignor to The Fanner Manufacturing Company, Cleveland, Ohio, a corporation of Ohio Application October 31, 1935, Serial No. 47,653

12 Claims. (Cl. 217—99)

This invention relates to improvements in valves for tap bushings, and more particularly to an improved flapper type of valve therefor.

In containers such as beer barrels, if the tap hole through the bushing is not closed after the contents are withdrawn, it becomes a source of attraction for flies and other insects which crawl into the barrel and contaminate the same. It is therefore desirable to make a valve which will automatically close the tap hole of the barrel after the tap tube is removed and one which will not interfere with the operation of tapping the barrel.

Although tap valves have heretofore been contemplated, those previously constructed were complicated in structure, which increased the cost and often prevented them from being effective for the purpose intended.

One of the principal causes of failure in the prior art devices was that the act of pitching the barrel gummed up the working parts, i. e., springs, levers, etc. so that the device soon became inoperative. Another disadvantage was that the valve could not be constructed accurately with economy to provide an efficient seat.

In the present invention, the various disadvantages of the prior art devices have been eliminated and a new tap bushing valve has been provided which is simple and economical to manufacture, and in which the working parts are protected from the effects of the pitch and cannot, because of pitch or other foreign material, become inoperative. Furthermore, there are no interstices or crevices which cannot be cleaned and hence contaminate the next batch of material introduced into the barrel. The improved design insures an efficient seat for the valve and yet is economical to manufacture.

Still other advantages of the invention will appear from a reference to the following description of an embodiment thereof which description has been illustrated by the accompanying drawings.

In the drawings:

Fig. 1 is a plan view on an enlarged scale of a tap bushing with the valve of my invention;

Figs. 2 and 3 are sections on the lines 2—2 and 3—3 respectively of Fig. 1;

Fig. 4 is a fragmentary section of a modified form of flapper valve;

Fig. 5 is a vertical medial section of a modified form of valve; and

Fig. 6 is a section on the line 6—6 of Fig. 5.

Referring now to the drawings, throughout which like parts have been designated by like reference characters.

As best shown in Fig. 3, the tap bushing 1 is screw-threaded in the end 2 of a barrel and has a centrally disposed nipple 4 provided with a tap hole 5 adapted to receive the usual tap in a manner well known. The inner end of the tap hole has an annular shoulder 6 adapted to provide a seat 7 for a valve 8.

The valve 8 is spring-pressed against the seat and is hingedly supported to permit the same to be pushed away from the inner end of the tap hole by a tap rod, not shown. A pair of lugs or trunnions 9 and 10 are provided on the inner end of the bushing and the lug 9 has a bore 11 extending partially therethrough, while the lug 10 has a bore 12 in axial alignment with the bore 11 extending entirely therethrough. A boss 13 is provided on the lug 10, and has a threaded opening adapted to receive a set screw 14 which may be screwed inward to extend into the bore 12 for a purpose later described.

The valve which may be termed a flapper valve has a head 8 having sufficient area to cover the inner end of the tap hole. A hollow pintle 15 is provided and may be cast integral with the valve head, having its axis substantially tangential thereto. A reinforcing rib 16 extends from the body of the pintle to the center of the valve head and the end of the pintle is reduced as at 17 adapting it to be rotatably journalled in the bore 11 of the trunnion 9.

The other end of the pintle terminates slightly beyond a center line drawn through the valve head and rib 16 and is provided with a counterbore 18 adapted to be rotatably telescoped over the reduced end 19 of an adjusting pintle element 20. The adjusting pintle element 20 comprises a cylindrical shell closed at the outer end 21, adapted to be journalled in the lug 10 and held against rotation and in the lug by the screw 14. The inner end of the adjusting pintle element is open and the bore cooperates with the bore in the movable pintle to form an axially disposed cylindrical chamber 24, which is closed at one end by the wall 25 of the lug 9 and at the other end by the end wall 21. The rotatable end of the pintle 15 might be closed and the wall 21 of the lug eliminated, but I prefer the structure shown as it better prevents the ingress of foreign matter.

A pin 26 is disposed diametrically through the end 11 of the pintle 15 and another pin 27 is disposed diametrically through the end of the adjustable pintle element 20. A helical spring 30 has its ends 31 and 31' hooked over the pins 26 and 27.

In operation the device is assembled as shown, except that the screw 14 is not tightened; a screw driver is inserted in the slot 22 and the adjustable pintle element is rotated counter-clockwise as viewed in Fig. 1 until the desired tension on the spring is transmitted to the pintle 15 to maintain the valve head against the seat. The screw 14 is then screwed in holding the adjustable pintle element in the desired fixed position.

Sufficient tension is placed on the valve head in this manner to maintain the valve in a tightly closed position, but not sufficiently tight to prevent a tap rod from rotating the valve head on the pintle against the tension of the spring when tapping the barrel.

When the barrel comes from the brewery the tap hole 5 is plugged by a cork, not shown. When the barrel is tapped, a tap is connected to the nipple 4 and the tap rod is used to force the cork into the barrel; the tap extending into the barrel holds the valve open. When the tap is removed from the barrel the tension on the spring 30 causes the valve to immediately close the opening, preventing the ingress of flies, insects and foreign matter.

Inasmuch as all of the working parts are fitted to a close tolerance, and the spring is retained in a substantially closed chamber, no pitch or other material can gain access to the working parts to clog the same and prevent their operation.

In Fig. 4 there is shown a modified form of valve head which comprises a segment of a sphere seated on a like seat. I also contemplate a conical seat and valve face. I do not, however, desire to limit myself to any particular type of valve face and seat as other types may also come within the purview of my invention.

In Figs. 5 and 6 I have illustrated an improved type of connection for the flapper valve to the pintle which affords a substantially self-aligning valve and seat, permitting greater tolerance in the manufacture and hence considerably economizing in the cost of the same. In this instance the valve is not integral with the pintle, but is suspended by a loose joint. An arm 40 extends from the pintle and is provided on its end with a socket 41 having a bore 42 disposed in axial alignment with the center of the tap hole. The valve comprises the valve head 43 having a face 44 which may be substantially a segment of a sphere adapted to set on the parti-spherical seat 45. The head is provided with an axially disposed stem 46 adapted to fit loosely in the bore 42 of the socket 41. A transverse aperture 47 is provided near the extremity of the stem and the stem is held loosely with the socket by a pin 48 which extends through the walls of the socket and the aperture 47. The skirt formed by the depending edge of the socket extends down around the valve stem to a point very close to the back of the valve and the edge of the skirt is surrounded by an annular rib 49 formed in the back of the valve.

It will thus be seen that the valve is provided with a universal action which permits the same to readily seat upon the face and furnish a very effective seal which could not otherwise be effected except by extreme accuracy in manufacture.

When the barrel is pitched, the pitch flows into the space between the skirt of the socket 41 and the rib 49, hardens and makes the head substantially rigid to the pintle. The pitch thus seals all the places where material might accumulate and affect the next batch introduced.

Having thus described my invention in an embodiment thereof, I am aware that certain changes in structure and placement of parts may be made, but without departing from the spirit and scope of the appended claims.

I claim:

1. In combination with a tap bushing, a flapper valve therefor including a valve head, a hollow hinge for hingedly supporting the valve head adjacent the tap hole, trunnions on said bushing for supporting said hinge adjacent the tap hole, a spring for resiliently maintaining the valve in closed position over said tap hole and being entirely enclosed within said hinge, one end of said hinge being rotatably journalled in said trunnion, the other end of said hinge being separable and rotatable relative to said first mentioned end, and adapted to be held in adjusted position in the other trunnion.

2. In a valve for a tap bushing, a pair of bosses supported by the bushing adjacent the tap hole of the bushing and having axially aligned bores, one of said bores extending entirely through the boss and the other extending partially therethrough and having a closed end, a flapper valve including a valve head adapted to close the tap hole of the bushing and a hollow pintle for rotating said valve supported in said bosses, one end of said pintle being integral with the valve and adapted to be rotatably seated in the boss having the closed end, the other end of the pintle being rotatably journalled on a hollow member removably journalled in the other boss, means to hold said hollow member in an adjusted position, a pin disposed diametrically through the integral pintle and a second pin disposed diametrically through the hollow member and a helical spring extending between said pins and adapted to be put under twisting tension by adjustment of the hollow member to maintain the valve closed.

3. In combination with a tap bushing, a flapper valve therefor including a pair of trunnions integral with the bushing, a rotatable pintle having a valve head extending laterally therefrom over the tap hole of the bushing, one end of the pintle being rotatably journalled in one of said trunnions, a fixed pintle adjustably supported in the other trunnion and having an end furnishing a bearing for the other end of the said rotatable pintle, said pintles having cooperating bores for forming a chamber coaxial with said pintles, means to hold the stationary pintle against movement in the trunnion, spring means disposed within said chamber and connected to said pintles to rotate the removable pintle in the trunnion to maintain the valve in closed position.

4. In combination with a tap bushing, a flapper valve therefor including a pair of trunnions integral with the bushing, a rotatable pintle having a valve head extending laterally therefrom over the tap hole of the bushing, a valve slot adjacent the tap hole, one end of the hollow pintle being rotatably journalled in one of said trunnions, a fixed pintle adjustably supported in the other trunnion and having an end furnishing a bearing for the other end of the said rotatable pintle, said pintles having cooperating bores for forming a closed chamber coaxial with said pintle, means to hold the stationary pintle in an adjusted position against movement in the trunnion, spring means disposed within said chamber and connected to said pintles to rotate the removable pintle in the trunnion to maintain the other in closed position on said slot.

5. In combination with a tap bushing, a flapper valve therefor including a pair of trunnions integral with the bushing, and having axially aligned bores, a rotatable pintle having a valve head extending laterally therefrom over the tap hole of the bushing, a valve seat adjacent the tap hole, one end of the said rotatable pintle being rotatably journalled in the bore of one of said trunnions, a fixed pintle adjustably supported in the bore of the other trunnion and being provided with a reduced end, furnishing a bearing for the other end of the said rotatable pintle, said pintles each having cooperating axial bores for forming a closed chamber coaxial with said pintle, screw means to hold the stationary pintle in an adjusted position against movement in the trunnion, spring means disposed within said chamber and connected to said pintles to rotate the removable pintle in the trunnion to maintain the valve in closed position on said seat.

6. In combination with a tap bushing having a tap hole therein, a flapper valve therefor including a pintle supported by the bushing, an arm connected to the pintle and a valve suspended from the end of said arm by a floating connection adjacent the tap hole.

7. In combination with a tap bushing having a tap hole therein, a flapper valve for the tap hole, including a pintle supported by the bushing, an arm extending from said pintle over the tap hole, a valve for closing the tap hole loosely supported on the end of said arm adjacent the tap hole, and adapted by introducing of pitch in the barrel, to be immovably secured to the arm.

8. In combination with a tap bushing having a tap hole therein, a flapper valve for the tap hole including a pintle supported by the bushing, an arm extending from the pintle and having a socket on the end disposed over the tap hole, a valve for the tap hole having a stem adapted to be loosely disposed in said socket, an annular ridge on the back of said valve surrounding the lower extremity of the socket, said valve adapted to be immovably secured to the socket by pitch.

9. In combination with a tap bushing having a tap hole therein, a flapper valve for the tap hole including a pintle supported by the bushing, an arm extending from the pintle and having a socket on the end disposed over the tap hole, a valve for the tap hole having a stem adapted to be loosely disposed in said socket, an annular ridge extending from the back of said valve and surrounding the lower edge of the said socket, the area between the ridge and the socket adapted to be filled with pitch to immovably secure the valve to the socket.

10. In a valve for a tap bushing, a pair of bosses supported by the bushing adjacent the tap hole of the bushing and having axially aligned bores, one of said bores extending entirely through the boss and the other extending partially therethrough and having a closed end; a valve head adapted to close the tap hole of the bushing and a hollow pintle for carrying said valve supported in said bosses, one end of said pintle adapted to be rotatably seated in the boss having the closed end, the other end of the pintle being rotatably journalled on a hollow member removably journalled in the other boss, means to hold said hollow member in an adjusted position, a pin disposed diametrically through the integral pintle and a second pin disposed diametrically through the hollow member and a helical spring extending between said pins and adapted to be put under twisting tension by adjustment of the hollow member to maintain the valve closed, said valve carrying pintle having a socket on the end and said valve having a stem loosely disposed in said socket, an annular ridge of the back of the valve surrounding the lower extremity of the socket, said valve adapted to be immovably connected to the socket by pitch.

11. In combination with a tap bushing, a valve for closing the tap hole including a valve head, said valve head being hingedly connected to said bushing in operative relation to said tap hole by means of a spring actuated hinge, said hinge being formed with a housing completely enclosing the spring against foreign material.

12. In combination with a tap bushing, a valve for closing the tap hole including a valve head, said valve head being hingedly connected to said bushing in operative relation to said tap hole by means of a spring actuated hinge, said hinge being formed with a housing completely enclosing the spring against foreign material, and means forming a part of the hinge to regulate the tension of said spring.

SAMUEL H. GIBSON.